US012797719B2

(12) United States Patent
Huang et al.

(10) Patent No.: US 12,797,719 B2
(45) Date of Patent: Nov. 17, 2026

(54) WAY TO LAUNCH A LARGE NUMBER OF GAME INSTANCES IN DIFFERENT LEVELS ON A CLOUD PLATFORM

(71) Applicants: Advanced Micro Devices, Inc., Santa Clara, CA (US); ATI Technologies ULC, Markham (CA)

(72) Inventors: AnZhong Huang, Shanghai (CN); ZhengSan Jian, Shanghai (CN); Weilie Zhao, Markham (CA); Owen Zhang, Toronto (CA)

(73) Assignees: Advanced Micro Devices, Inc., Santa Clara, CA (US); ATI Technologies ULC, Markham (CA)

( * ) Notice: Subject to any disclaimer, the term of this patent is extended or adjusted under 35 U.S.C. 154(b) by 0 days.

(21) Appl. No.: 18/393,656

(22) Filed: Dec. 21, 2023

(65) Prior Publication Data

US 2025/0339768 A1 Nov. 6, 2025

(51) Int. Cl.
*A63F 13/358* (2014.01)
*A63F 13/355* (2014.01)

(52) U.S. Cl.
CPC .......... *A63F 13/358* (2014.09); *A63F 13/355* (2014.09)

(58) Field of Classification Search
CPC ............................ A63F 13/358; A63F 13/355
See application file for complete search history.

(56) References Cited

U.S. PATENT DOCUMENTS 8,380,681 B2 * 2/2013 Oltean .................... G06F 16/11 707/706
9,299,126 B2 * 3/2016 Fries .................. G06F 12/0246
12,038,819 B2 * 7/2024 Patle .................. G06F 11/3656
12,154,211 B2 * 11/2024 Ma ........................ G06T 15/005
2009/0287901 A1 * 11/2009 Abali .................. G06F 12/1009 711/216
2014/0337835 A1 11/2014 Johnson (Continued)

OTHER PUBLICATIONS

International Search Report and Written Opinion for International Application No. PCT/US2024/033574, mailed Sep. 27, 2024, 13 pp.

(Continued)

*Primary Examiner* — Ankit B Doshi
(74) *Attorney, Agent, or Firm* — Kowert, Hood, Munyon, Rankin & Goetzel, P.C.; Rory D. Rankin

(57) ABSTRACT

Systems and methods for efficient sharing of memory space in cloud-based applications are described. Data that can be shared between multiple instances of an application is identified and a dedicated memory space is allocated to such data. Whether the data can be shared or not is determined based on the data's content, to avoid corruption and irregular allocations. In conditions where data needs to be shared, a processing circuitry can determine if the data is already in use by another application instance. If so, a shared memory comprising the data is identified and a reference counter for the shared memory is updated. If no other application instances currently use the data, a selected shared memory is assigned to the data and the data is copied from its dedicated memory space to the selected shared memory. In either condition, the original memory space is freed-up, thereby ensuring efficient memory usage.

20 Claims, 5 Drawing Sheets

(56) References Cited

U.S. PATENT DOCUMENTS

| | | | | |
|---|---|---|---|---|
| 2019/0272461 | A1* | 9/2019 | Ravindranath | G06N 3/045 |
| 2021/0042255 | A1* | 2/2021 | Colenbrander | G06F 13/4059 |
| 2022/0180588 | A1* | 6/2022 | Schluessler | G06T 15/005 |
| 2022/0206795 | A1* | 6/2022 | Maiyuran | G06F 9/3013 |

OTHER PUBLICATIONS

Bhojan Anand et al: "CloudyGame: Enabling cloud gaming on the edge with dynamic asset streaming and shared game instances", Multimedia Tools and Applications, Kluwer Academic Publishers, Boston, US, vol. 79, No. 43-44, Aug. 27, 2020 (Aug. 27, 2020), pp. 32503-32523.

* cited by examiner

WAY TO LAUNCH A LARGE NUMBER OF GAME INSTANCES IN DIFFERENT LEVELS ON A CLOUD PLATFORM

BACKGROUND

Description of the Related Art

In a cloud application setup, a regular Internet-connected device like a smartphone or tablet can be employed by a user to establish a connection with an application, such as a video game server through the Internet. The application initiates an instance for the user, which can also apply to multiple users. For instance, the video game server can generate visual frames of content and produces audio in response to a player's actions (such as movements and selections) and other game-related attributes. The encoded video and audio are then transmitted via the Internet to the player's device, where they are displayed as visible images and audible sounds. As a result of this approach, players from any location across the globe can engage in video games without requiring specialized video game consoles, specific software, or dedicated graphics processing hardware.

In some cloud-based applications, more than hundred instances of an application may have to be concurrently launched for different users, e.g., using a single GPU. Each such instance may consume a major chunk of GPU memory, such that the performance drops rapidly, e.g., since SDMA engines can be extremely busy paging allocations from system memory to GPU memory for accessing relevant data. In order to make the system more efficient, GPU memory is shared among different instances of the application, so as to reduce the memory footprint, e.g., when running the same scene using the same images. However, such memory sharing can cause corruption, especially when application instances are running into different levels (e.g., different levels of a video game).

In view of the above, improved systems and methods for providing memory sharing for distinct application instances are required.

BRIEF DESCRIPTION OF THE DRAWINGS

The advantages of the methods and mechanisms described herein may be better understood by referring to the following description in conjunction with the accompanying drawings, in which.

DETAILED DESCRIPTION OF IMPLEMENTATIONS

Figure 1:
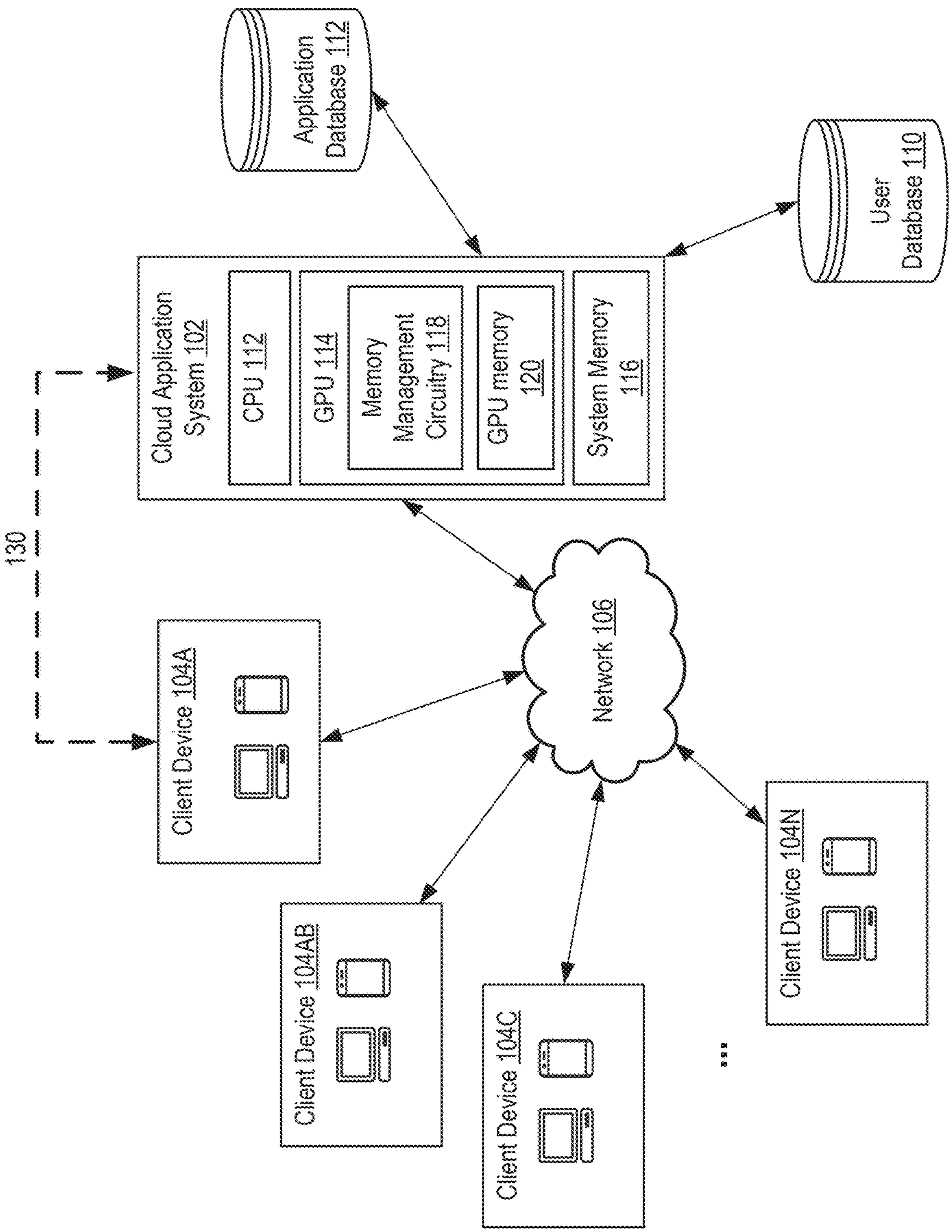
FIG. 1 is a block diagram illustrating an exemplary network implementation of a cloud application system.

In the following description, numerous specific details are set forth to provide a thorough understanding of the methods and mechanisms presented herein. However, one having ordinary skill in the art should recognize that the various implementations may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

Systems, apparatuses, and methods for efficient sharing of memory spaces in cloud-based applications are described. In an implementation, data blocks can be shared between multiple application instances (e.g., different levels of a game running on different client devices). The data is shared, in one example, based on the data's content rather than its properties, to avoid corruption and irregular allocations. The data that is deemed as sharable is identified and a dedicated memory space is allocated to such data. In conditions where data needs to be shared, a processing circuitry can determine if the data is already in use by another application instance. In an implementation, if the data is already in use, a shared memory storing the data is identified and a reference counter for the shared memory is updated. In another implementation, if no other application instances currently use the data, a selected shared memory is assigned to the data and the data is copied from its dedicated memory space to the selected shared memory. In either condition, the original memory space is freed-up, thereby ensuring efficient memory usage.

In an implementation, "application instance" as described hereinafter refers to a single occurrence or instantiation of an application running on a computing system. For example, in a context of software development and deployment, an application instance represents a single running copy of an application, which can encompass all its components, processes, and data, interacting with users or other systems to fulfill its intended purpose. Each application instance is separate from others and operates independently. It has its own memory space, resources, and runtime environment. For example, for a web application, each time a user accesses the application through a web browser, a new instance of the application is created to handle that user's interaction. Similarly, in cloud computing or server environments, multiple instances of an application can execute concurrently to handle different user requests or tasks.

In one implementation, an application instance can include an instance of a gaming application. In order to interact with an instance of the gaming application, a player connects to a game server through a network connection, either on their personal computers, gaming consoles, or mobile devices. For example, the user can join a virtual environment or game world where they can interact with other players who are also connected to the same server. The gameplay application instance begins when the player logs into the game and ends when they log out or disconnect from the server. In the description that follows, the terms "application instance" and "instance" are used interchangeably.

In an implementation, as described herein, data blocks can be "shared" between multiple application instances, i.e., content of a given data block (such as an image) can be used by multiple rendering (or other) tasks simultaneously (e.g., using parallel processing) to generate graphics outputs at multiple client devices running distinct application instances. These outputs can be similar (e.g., a scene rendered in a game that only has a single level) or different (e.g., scenes rendered during distinct levels of a complex game). In another implementation, "shared memory blocks" described herein refer to memory locations or memory "blocks", that can be accessed by multiple processes or tasks, such that these processes may share data (e.g., a data block) by accessing the shared memory block (i.e., the same block of memory). In this manner, sharing memory locations (or blocks) enables the sharing of data. In various implementations, discussion of a shared memory block implies sharing of data (or a data block) stored within the memory block unless otherwise indicated.

FIG. 1 is a block diagram illustrating an exemplary network implementation of a cloud application system. As shown, a computing system 102 (alternatively referred to as a cloud application system 102 or simply application system 102) is connected to a plurality of client devices 104A-N (hereinafter also referred to as user devices 104A-N) over a network 106. In an implementation, the application system 102 is configured to establish an application instance for an application, responsive to a request (i.e., user input) from a given user device 104, to facilitate the user device 104 to engage with the application. For example, the application system 102 can receive the user input from a user device 104 for accessing a cloud gaming application. In response to receiving the input, the application system 102 is configured to provide access to a requested instance of the cloud gaming application to the user device 104. In one implementation, a peer-to-peer (P2P) connection between the user device 104 and the cloud application system 102 is established to enable the user device to remotely engage with the application instance. For example, as shown in the figure, a P2P connection 130 is established between cloud application system 102 and user device 104A.

In an implementation, a given user device 104, is any device that is configured to communicate wirelessly and/or in a wired fashion with the application system 102 over a network, such as the network 106. In an example, the plurality of user devices 104A-N includes one or more of mobile devices, personal computers, laptops, gaming consoles, and the like. In another implementation, a user device 104 is configured to request the application system 102 for execution of a desired application, when the user device 104 is unable to host the application locally owing to lack of required infrastructure and/or computing resources.

For example, a user device 104 can send a request to application system 102 to connect with a cloud gaming application, to access a desired game title, the application system 102 identifies a user associated with the user device 104, by accessing user account information stored in a user data store, e.g., user database 110. The application system 102 validates the identified user to determine one or more game titles that the user device 104 is authorized to access. In an implementation, the application system 102 interacts with an application database 112 to determine the one or more game titles that the user device 104 is authorized to access. When it is determined that the user device 104 is authorized to access the game title, the application system 102 establishes a network connection between for the user device 104 to allow the user device 104 to remotely control the gameplay instance using one or more user interfaces (not shown) generated at the user device 104.

In an implementation, the application system 102 can at least include CPU 112, GPU 114, and system memory 116, amongst other components (not shown for the sake of brevity). The GPU 114 further includes a memory management circuitry 118 (alternatively referred to as MMC 118) and GPU memory 120. In one or more implementations, when multiple instances of a single application are running on different client devices 104A, each client device 104 can generate inputs when engaging with an application instance, e.g., by using one or more controllers such as a keyboard, mouse, gaming controller, etc. These client inputs are received by the application system 102 over the network 106. The inputs are then processed by the CPU 112 and the GPU 114 to generate a graphics output to be relayed back to the client devices 104.

For instance, multiple instances or levels of a cloud gaming application can be executed for multiple client devices 104 simultaneously. Each different client device 104, when engaging with a such an instance, can generate client inputs using hardware or software local to the client device 104. These inputs are received by the cloud application system 102 over the network 106. In an implementation, responsive to the client input, a plurality of images can be generated, wherein any given "image" is a single frame or view of a game that has been rendered by the GPU 114. These rendered images are then encoded and streamed to the client device 104 for display. In one implementation, each frame of the game is essentially an image that contributes to the overall gameplay experience.

In one implementation, when different instances or levels of a specific game are running concurrently on multiple client devices 104, "image views" are generated. Image views can be a subset or view of a previously generated image. In some examples, when the cloud application system 102 uses graphics APIs, an image view provides a way to interpret or access a specific region of an image's data. For example, in APIs such as Vulkan or DirectX, when rendering graphics, an image is created (i.e., a large block of memory for storing pixel data) and then multiple image views are generated by the CPU 112, each representing different portions of that image. When cloud gaming applications are executed by the application system 102, these image views correspond to different visual representations of game frames that are being streamed to different client devices 104. Any given image view represents a current state of the game's visuals from a specific perspective, usually a player's point of view. Other implementations of images and image views, e.g., for non-gaming cloud applications are contemplated.

In an implementation, when images are generated by the GPU 114, these are stored as data blocks, e.g., by allocating a portion of the GPU memory 120 to each data block. For instance, each data block containing an image is "bound" to a specific part of the GPU memory 120 such that the image can be accessed, rendered to, or sampled from by shaders or other parts of a graphics pipeline (not shown). In another implementation, different image views generated for the image are correlated to a descriptor set, e.g., by the CPU 112. Correlating image views to descriptor sets, in one example, includes mapping resources, such as buffers and textures, to shaders for use in a rendering pipeline. A descriptor set, in one implementation, provides a way to associate these resources with shader stages (vertex, fragment, compute, etc.) and to specify which resources should be used in a particular shader invocation. These descriptor sets manage the communication between the CPU 112 and the GPU 114, ensuring that the appropriate data blocks are available to shaders when needed.

In one implementation, multiple instances or levels of a cloud application running concurrently on the GPU 114 can limit the efficiency of the cloud application system 102 due to the GPU memory 120 being insufficient for managing data blocks generated as a result of executing the instances simultaneously. Traditionally, when executing these multiple instances, the GPU 114 would generate duplicate data blocks, e.g., where two different instances of the application request the same data for render. For example, same data blocks can be requested when two instances run the same scene, and in such cases data blocks can be shared between multiple rendering operations, e.g., by allowing access to a shared memory block within the GPU memory 120 that stores the data block. In one implementation, data blocks "shared" between application instances or rendering operations as described herein means that content of a given data block can be used by multiple rendering tasks simultaneously to generate graphics outputs at multiple client devices. These outputs can be similar (i.e., a scene rendered in a game that only has a single level) or different (e.g., scenes rendered during distinct levels of a complex game).

In one example, data blocks can be shared based on the properties of the data block and an ordinal index. However, with increase in complexities in the application, sharing data blocks simply using their properties and/or index can cause corruption of data. For instance, data corruption can occur in a cloud gaming application, when different client devices 104 interact with different levels of the game at a given time. This is because, for a game application having multiple different game levels running concurrently, the game's behavior during the different game levels can be inconsistent. Therefore, a decision on sharing of data blocks between different levels of the game cannot be made merely using the data's properties and/or ordinal index. Further, it can also be difficult to share a data block between multiple game instances based on the content of the data block, since one or more tasks executing for rendering the game instances may have already referenced the data block's original memory allocation in the GPU memory 120, before the content of the data block is uploaded by the system 102.

As described herein, different types of memory allocations for data blocks are possible. In one example, a given data block may be assigned a dedicated memory block or a non-dedicated memory block within the GPU memory. As described hereinafter, a non-dedicated memory block is a suballocation of memory from a pool of GPU memory. The suballocation of memory can be defined as allocating a large chunk of GPU memory upfront, and then dividing this chunk into smaller non-dedicated memory blocks to be used for each separate data block. All non-dedicated allocations for individual data blocks are made from this pre-allocated memory pool. In another implementation, the data block can be assigned a memory block using dedicated memory allocation. In contrast to non-dedicated memory block allocation, assigning a dedicated memory block to data blocks ensures that memory is allocated individually for each data block. That is, each data block is assigned its separate memory space. Further, assigning a "shared memory block" to a given data block means allowing access to the data block concurrently between multiple processes and tasks. That is, multiple processes or applications can access and modify the same region of memory (storing the data block) concurrently. These terms are used hereinafter as defined above, unless otherwise indicated.

In various implementations, systems and methods described herein enable sharing of data blocks when executing different levels of an application, by replacing a memory block originally assigned for a data block, e.g., using dedicated memory allocation, with a shared memory block. In an implementation, the content of the data block is stored in the shared memory block before a rendering circuitry renders data based on the data block. In one example, the data block is assigned a shared memory block based on the content the data block. In an implementation, the MMC 118 can track usage of each data block generated as a result of execution of an application instance and generate a content identifier for the given data block, that represents the content of the given data block. Tracking the usage can include tracking use of the data block in one or more graphics processes, such as command line rendering, referencing of the data block by command buffers, and other tasks. Based on the tracked usage, the MMC 118 generates the content identifier for the data block. If the data block is to be shared between different instances of the application, the MMC 118 queries one or more shared memory blocks of the GPU memory 120 that store the content identifier of the data block, indicating that similar content is stored previously in the GPU memory 120. If no such shared memory block is found, i.e., no instances are currently using the data block, the MMC 118 can copy the content of the data block from its dedicated memory block to a selected shared memory block, and assign the content identifier to the selected shared memory block. If, however, an existing shared memory block already stores the content of the data block, the MMC 118 can update a reference count for the shared memory block indicating that another instance is using content stored in the shared memory block.

In an implementation, the dedicated memory block originally assigned to the data block is freed up by the MMC 118 responsive to the content of the data block being copied (or otherwise already available) in the shared memory block. The dedicated memory block can then be made available for use by other tasks. Further, all references to the dedicated memory block associated with the data block are replaced with a memory address of the shared memory block by the MMC 118, e.g., in a data structure correlating data block content with corresponding memory addresses.

In several implementations, the solution for sharing content presented herein can support existing cloud-based applications (e.g., games using Vulkan APIs) and modification to the application software or application engine may not be required. Further, sharing memory blocks between different application instances as described herein can save on GPU memory when running instances in different game levels. Therefore, more instances could be launched on a single GPU (or GPU cluster) without diluting graphics quality. Furthermore, unintended duplications or corruption when sharing data can be avoided when different images are shared. In some implementations, the system and methods described herein can further be used to determine which data can be sharable (or is potentially sharable) between instances of an application. Other implementations are contemplated.

Referring again to the cloud gaming implementation, once the dedicated memory block for an image is replaced with a shared memory block, the MMC 118 associates the image to the shared memory block (which was earlier associated with the dedicated memory block). Further, the image view for the image is updated by the MMC 118, wherein the new image view references the memory address of the shared memory block instead of the memory address of the dedicated memory block. For example, a descriptor set is updated to be correlated with the new image view, such that one or more shader programs can access the image content from the shared memory block in the GPU memory 120.

As described herein, "memory management circuitry" or MMC (e.g., MMC 118) refers to the electronic components and systems within the cloud application system 102 that are responsible for managing various aspects of memory resources. MMC is configured to ensure efficient use of memory, enables memory protection, and facilitates the organization of data storage and retrieval. In one implementation, MMC can have manage multiple levels of memory hierarchy, including registers, cache memory, main memory (RAM), and secondary storage (hard drives, SSDs). MMC controls data movement between these different levels, optimizing performance and reducing latency. Further, MMC can be responsible for interfacing between the CPU 112 and the system memory 116 and can handle tasks such as addressing memory locations, managing data transfer, and controlling memory access patterns. Other implementations of MMC components are contemplated and are within the scope of this disclosure. Detailed working of exemplary memory management circuitries is described with respect to FIGS. 2 and 3.

Figure 2:
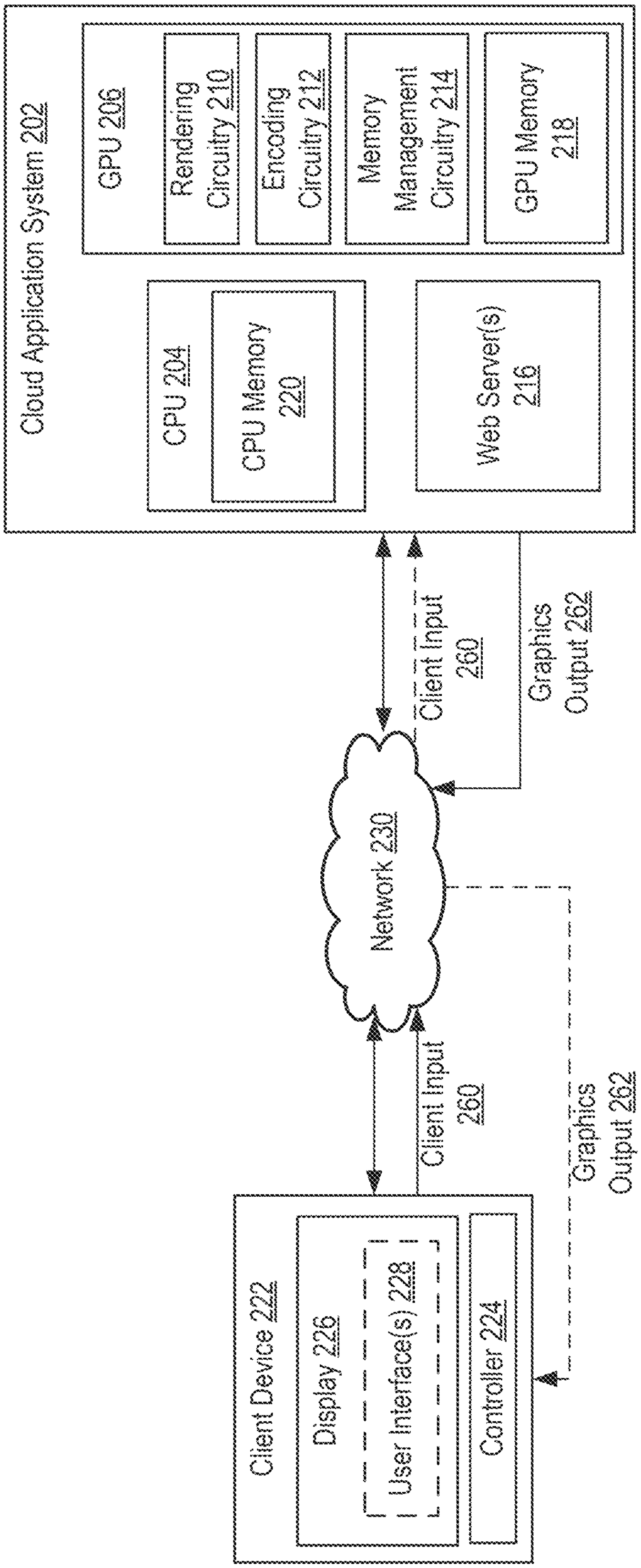
FIG. 2 is a block diagram illustrating an exemplary implementation of various components of the cloud application system.

Turning now to FIG. 2, a block diagram of an exemplary implementation of various components of a cloud application system 202 (or simply "system 202") is illustrated. Although the cloud application system 202 is described herein with respect to processing of image data in cloud gaming applications, other applications and other types of data are contemplated. As shown in the figure, the system 202 comprises a central processing unit (CPU) 204, a graphical processing unit (GPU) 206, and one or more web servers 216. The GPU 206 includes rendering circuitry 210, encoding circuitry 212 and memory management circuitry (or MMC) 214. The system 202 further includes CPU memory 218 and GPU memory 220. In other implementations, the system 202 can include additional processors and circuitry, however these are not shown for the sake of brevity.

In an implementation, the processors of the application system, i.e., CPU 204 and GPU 206 include multiple cores configured to execute instructions. In some implementations, the processors further include additional circuitry configured to perform parallel processing. In some implementation, these processors are systems on a chip (SOC) including multiple hardware components (e.g., memory controller, etc.). Multiple such implementations are possible and are contemplated. For instance, as shown, the GPU 206 includes rendering circuitry 210, encoding circuitry 212, and MMC 214, in order to perform one or more functions described herein.

In an implementation, "cloud gaming", as used herein, involves rendering video games on system 202 and streaming video or graphics output (e.g., graphics output 262) to client devices over a network. For example, system 202 can execute or render a gaming application instance requested by the client device 222 responsive to a client input 260 received from the client device 222. In one implementation, the client device 222 can engage with the application instance based at least in part on commands generated using one or more controllers 224. Example client devices can include smartphones, gaming consoles, computers, etc. Further controllers 224 can include keyboard, mouse, gaming controllers, joystick, and the like.

In an implementation, rendering circuitry 210 includes specialized hardware components for generating visual output, typically for displays such as computer monitors, TVs, and other screens. The rendering circuitry 210 converts digital information into images that can be perceived through a client device display. In one implementation, rendering circuitry 210 can include a graphics pipeline, such as that having circuitry for graphics processes such as vertex processing, tessellation, geometry processing, rasterization, and the like. In another implementation, encoding circuitry 212 includes specialized hardware components for converting analog or digital information into specific encoded format and for data transmission, storage, and compression. These components can include Analog-to-Digital Converter, Digital-to-Analog Converter, data compressors, audio/video encoders, and the like. In one implementation, encoding circuitry 212 includes a video coding engine (VCE). Other implementations are contemplated.

In one implementation, system 202 receives the client input 260 and translates the inputs into one or more game commands (e.g., character movement, shooting, etc.) to render the game based on the client input 260. The system 202 processes the commands generated from the client input 260, e.g., for simulating the game world and updating a game state. In an implementation, based on the clients input 260, numerous images can be produced. Each of these "images" can correspond to an individual frame or perspective of a game that the GPU 206 has processed and rendered. These rendered images are subsequently compressed and sent over to the client device 222 for visual presentation (e.g., on display 226). In one implementation, each game frame functions as an image that collectively enhances the overall gameplay.

The images created in response to the client input 260 are stored in the GPU memory 220. Further, new images are created and stored by MMC 214 in the GPU memory 220, responsive to continuous inputs from the client device 222. In an implementation, each created image is allocated memory space within the GPU memory 220. For instance, based on the cloud application specifics, either a dedicated memory block or a suballocated memory from a large pool of GPU memory 220 is allocated to an image. In one implementation, in situations wherein the image content is to be shared between different application instances, doing so may be difficult if the image is allocated a non-dedicated memory block, e.g., from a suballocation of a large pool of GPU memory. This is because the pool of memory may be associated with several different memory allocations all with different usages. Therefore, the MMC 214, responsive to identifying a request by the application for a non-dedicated memory block for the image in the GPU memory 220, can transform this request to instead allocate a dedicated memory block for the image. This way, once sharing of the image content is to be realized, the MMC 214 can simply move the content from the dedicated memory block to a shared memory block accessible by multiple instances, thereby enabling sharing of the image content.

In one implementation, when different instances or levels of the gaming application need to run concurrently on multiple client devices, "image views" are created, e.g., by the CPU 204. Image views can be a subset or view of a previously generated image. In some examples, when the system 202 uses graphics APIs, an image view can provide a way to interpret or access a specific region of an image's data. For example, in APIs such as Vulkan, when rendering graphics, an image is created (i.e., a large block of memory for storing pixel data) and then multiple image views are generated by the CPU 204, each representing different portions of that image. When multiple instances of the gaming application are rendered by the system 202, these image views correspond to different visual representations of gaming application frames that are being streamed to different client devices. Each unique image view is updated to a data structure defining how resources (e.g., buffers, images, etc.) are accessed by shaders during rendering operations. In one example, "descriptor sets" can be generated that can serve as a bridge between the CPU 204 and GPU 206, whilst specifying where resources are located in the GPU memory 220 and how shaders can use them. In one implementation, these descriptor sets are stored in CPU memory 218.

The MMC 214 can track the usage of the image, e.g., by recording one or more tasks using the image and/or recording an object status for the image, i.e., a current state or attributes of the image within a scene to be rendered. Further, the usage can be further be tracked by recording usage of the dedicated memory block allocated for the image, the image views for the image, the descriptor sets for the image, and one or more command buffers that would update the content of the image. Based on the tracked usage of the image, the MMC 214 can generate a content identifier representing the content of the image. In one example, the content identifier can be generated by copying the content of the image from the GPU memory 220 to an accessible CPU memory (e.g., CPU memory 218). In an implementation, the content identifier can be a content hashcode or hash value for the image. The content hash value, in one example, can be generated after the content of the image is updated by one or more command buffers, by using a "fence" command. That is, by using the fence command, the MMC 214 waits till the content of the image is updated before any further tasks are executed for the image. In alternate implementations however, the content identifier can be generated before the content is updated.

In one implementation, when different instances of the gaming application are running concurrently at different client devices (e.g., client devices similar to client device 222), some of these instances may need to render data based on (or otherwise using) the same image. For instance, some objects in different scenes of the gaming application can be similar. In order to achieve memory efficiency in such conditions, the MMC 214 is configured to share image data, such that the image data can be used by multiple tasks executing during the different instances (e.g., instead of the system requesting access to the image using different memory spaces separately for each instance). In an implementation, the image can be shared between these application instances based on the image's content, instead of just using the image's properties, to avoid corruption of data.

To this end, the MMC 214 is configured to query one or more shared memory blocks of GPU memory 220 to determine whether any of these shared memory blocks correspond to the content identifier generated for the image. If no such shared memory blocks are found, the MMC 214 selects any given shared memory block and assigns the content identifier for the image to the selected shared memory block. Further, content of the image from its dedicated memory block is copied to the shared memory block. However, if a shared memory block with the content identifier already exists, i.e., one or more tasks are already rendering from the image, the MMC 214 can increment a "reference count" for the shared memory block, e.g., to indicate that an additional application instance of the cloud gaming application is now accessing the image from the shared memory block.

Once content is copied from the dedicated memory block to the shared memory block (or is otherwise already available at the shared memory block), the dedicated memory block is freed up for use by other tasks or threads. Further, each reference of the dedicated memory block address is replaced with an address of the shared memory block. For example, the image that was initially correlated with a memory address of the dedicated memory block, can be associated with an address of the shared memory block. Further, the image view corresponding to the image is updated by the CPU 204, such that the new image view can reference the shared memory block address for all tasks. The descriptor set is also updated to be associated with the new image view to allow the shader programs to access the shared memory block from the GPU memory 220.

The process of replacing the dedicated memory block for the image with the shared memory block can be performed after the image is uploaded to a rendering command buffer, but before the rendering circuitry 210 renders the data from the image, e.g., to generate frames that can be displayed on a screen. That is, instead of querying a dedicated memory block each time the same image data is required, the rendering circuitry 210 can simply access this data from a shared memory block, thereby improving performance and system efficiency. Furthermore, when multiple instances (or levels) of the gaming application are to be executed concurrently, the rendering circuitry 210 can use the image data from the shared memory block to simultaneously execute several processes and/or tasks. In one implementation, image data is marked as sharable based on its content (e.g., using a content identifier). Marking data as sharable based on its content rather than on its properties ensures that data corruption does not occur when such data is shared by multiple rendering tasks in multiple gameplay instances.

In one implementation, when image data is updated (or new image data is generated), e.g., based on new client inputs received from client devices, the MMC 214 can regenerate the content identifier for the image. Further, the updated content is saved to a selected shared memory block and the content identifier is associated with the selected shared memory block. Again, the rendering circuitry 210 can access the shared memory block to render data based on the image using the updated image data.

In an implementation, encoding circuitry 212 is configured to encode the rendered images or frames, e.g., compressing and converting the raw pixel data of the image into a digital format to generate graphics output 262. The graphics output 262, as shown, is transmitted back to the client device 222 over the network 230. In one or more implementations, the graphics output 262 is displayed using user interface(s) 228 on a client display 226. Further, new client inputs generated, e.g., when user engages with the graphics using controllers 224 can be transmitted to the system 202 and processed by the system 202 using methodologies described above, for a seamless gaming experience.

Figure 3:
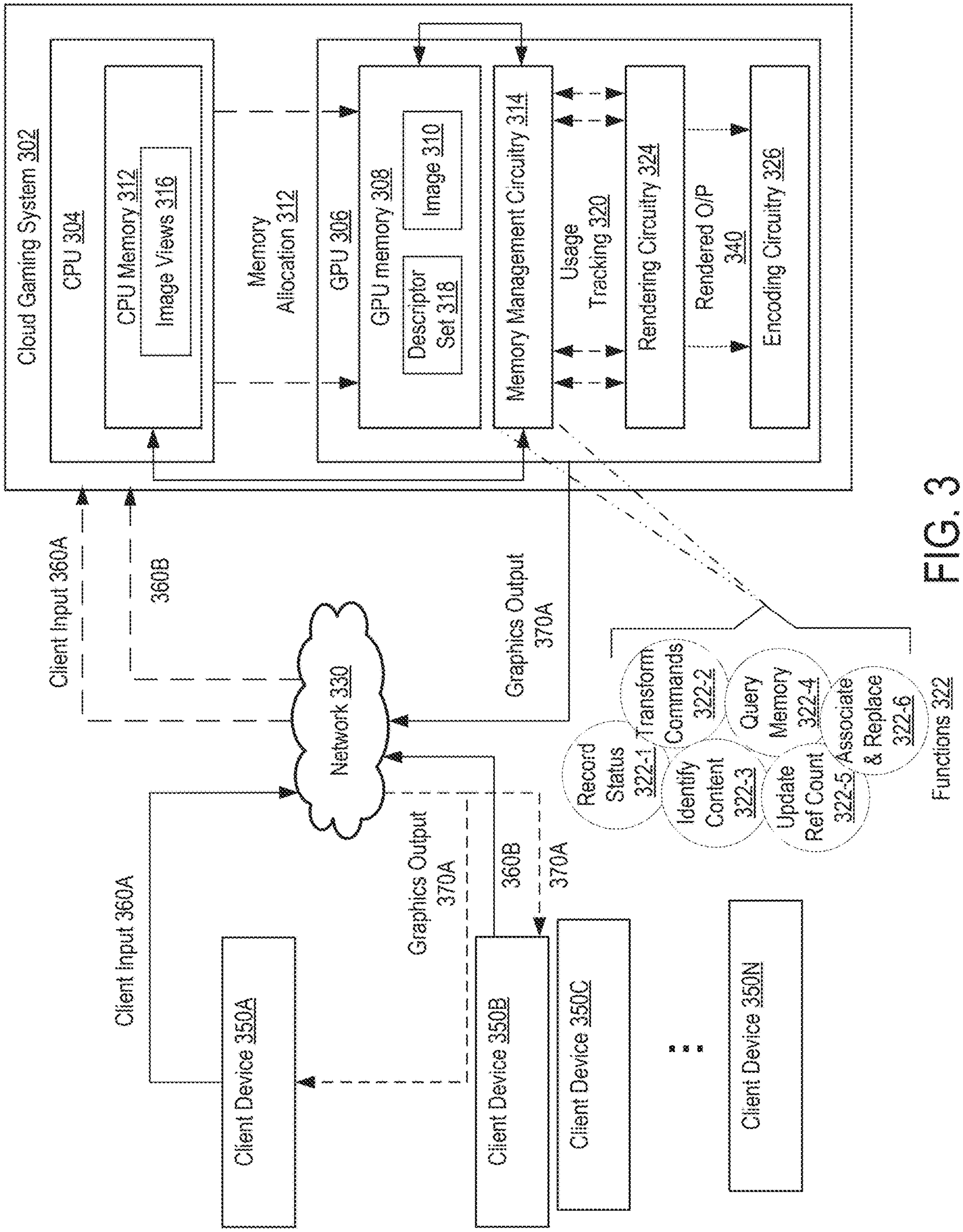
FIG. 3 is a block diagram illustrating memory sharing during multiple application instances.

Referring now to FIG. 3, a block diagram illustrating various tasks executed at a cloud gaming system. As used herein, a "game instance" as used herein refers to a specific occurrence of a video game. A game instance can be an individual playthrough of the game, often initiated by a player or a group of players. Each time a player starts a new game or loads a saved game, a new game instance is created. Further, a "game level", is a specific playable area within a video game. It is a distinct segment of the game's virtual world that players can explore, interact with, and complete objectives within. Levels are designed to provide a variety of challenges, environments, and experiences to the players. In one or more implementations, a game level is activated within a game instance. In the description that follows, "game instances," "game levels," or simply "instances" are used interchangeably to mean a distinct instance of a cloud gaming application.

As illustrated, cloud gaming system 302 (or simply "system 302") interacts with one or more client devices 350A-N, such that client input (e.g., client input 360A) received from any of these client devices is processed by the system to generate a graphics output (e.g., output 370A). In some implementations, the client inputs can be any input from a given client device (devices 350A-N) can be generated response to the client device engaging with a gameplay application instance through one or more controllers (not shown).

In one implementation, the client input 360A is received by CPU 304 such that the CPU 304 can process the client input 360A according to a program logic associated with the gaming application. For example, the client input 360A can be processed by the CPU 304 to validate and sanitize input data, e.g., to ensure the input data meets pre-requisite criteria. Further, based on the validated input, the CPU 304 executes instructions to generate images using the input data. In one implementation, these images can be generated using libraries, algorithms, or custom executions, such that images can be further used to create desired visual content from raw input data. Some exemplary resources and libraries used to generate images are described in detail with respect to FIG. 4. Further, although the description herein presents details regarding generation of image and image data, generation of other application data is contemplated and within the scope of this disclosure.

The CPU 304 can set the properties of the image, including its format (color, depth, etc.), dimensions (width, height), usage flags (render target, texture, etc.), and/or memory layout. Further, the CPU 304 can create an image object in GPU memory 308, e.g., using graphics API functions, based on these specified properties. In one implementation, the memory management circuitry 314 ("MMC 314") determines whether one or more of the created images are sharable between different game instances (e.g., when different client devices 350 run the gameplay application instance at different levels of the game). The images that can be shared can be marked as sharable by the MMC 314. In one implementation, the images can be marked as sharable based on image properties. Further, in another implementation, specific images, e.g., shader read-only images can be marked as sharable and other images are not marked as such. Further, target or depth-stencil images can be marked non-sharable. Other implementations of marking an image as sharable or non-sharable are contemplated.

In one implementation, the MMC 314 is configured to perform functions 322, including but not limiting to, record status 322-1, transform commands 322-2, identify content 322-3, query memory 322-4, update reference counts 322-5, and associate and replace 322-6. These functions are performed by the MMC 314 during one or more tasks executed by the CPU 304 or GPU 306. These functions 322 are described below in further detail. It is noted that functions other than described herein are possible and are contemplated. In one example, the MMC 314 is configured to perform the functions 322 after an image is uploaded to a rendering command buffer, but before the rendering circuitry 324 executes any task to render data based on the image 310. Further, some of these functions 322 can be performed during separate tasks being executed by the GPU 306 (e.g., as described by CPU threads). For instance, function associate and replace 322-6 can be performed during one or more rendering tasks and function identify content 322-3 and query memory 322-4 can be performed during an "updating" task, e.g., when an image's content is updated by the CPU 304. In other implementations, however, any of the given functions 322 can be performed during any tasks executed within the system 302. For example, identify content 322-3 function can be performed even before the actual content of the image is uploaded to a rendering command buffer.

In an implementation, the images created by the CPU 304 can be allocated memory spaces in the GPU memory 308. As depicted, an image 310 created by the CPU 304 is stored in the GPU memory 308 (memory allocation 312). For instance, based on the application configurations, either a dedicated memory block or a non-dedicated memory block within the GPU memory 308 may be assigned to the image 310. In one implementation, in situations wherein image data is to be shared between different application instances, doing so may be difficult if the image 310 is allocated a non-dedicated memory block of GPU memory 308. To avoid such situations, in an implementation, the MMC 314 can perform the transform command function 322-2, responsive to identifying a request by the application for a non-dedicated memory block for the image in the GPU memory 308. Responsive to the transform command function 322-2, the request for assigning a non-dedicated memory block can be transformed to instead request allocation of a dedicated memory block for the image 310. This can be done to ensure that once sharing of the image 310 is to be realized, the MMC 314 can replace the dedicated memory block for the image 310, by a shared memory block accessible by multiple tasks that can share the image data. In one implementation, the transform command 322-2 can only be performed for images that are marked as sharable. This can be done to ensure that sharable images can be easily shared and accessed by multiple tasks within the system 302. Non-sharable images, in one example, can continue being assigned non-dedicated memory blocks, e.g., suballocations of a GPU memory block in the GPU memory 308.

In one implementation, the image 310 created by the CPU 304 can be associated with one or more image views. The image view for the image 310 can represent different views of the image 310. For example, an image view can provide a way to interpret or access a specific region of the image's data. The image views can be stored in CPU memory 312 as shown by image views 316. The CPU 304 is further configured to generate descriptor set for the image views 316 and correlate the image views 316 to their corresponding descriptor sets. As shown in the figure descriptor sets 318 are stored in the GPU memory 308 by the MMC 314.

query memory 322-4 query memory 322-4 During execution of one or more tasks by the system 302, e.g., to render video and images for one or more client devices 350, the MMC 314 is configured to track usage (usage tracking 320) of each sharable image (already existing as well as newly created images) to determine if one or more of images need to be shared by these tasks. In one implementation, when different instances of the gaming application are running concurrently at different client devices (e.g., client devices 350A-N), one or more rendering tasks for these instances may need data from the same image to render scenes. For instance, some objects in different scenes of the gaming application can be similar and therefore could be rendered from the same data. In order to achieve memory efficiency in such conditions, the MMC 314 is configured to share the image content between tasks executing for these different instances (e.g., instead of the system accessing the image using different memory spaces separately for each instance).

In order to share image data between different application instances, the MMC 314 is configured to first track usage of a given sharable image (e.g., image 310). In one implementation, MMC 314 performs a record status function 322-1 to record a memory allocated for the image 310 as well as an image view 316 and associated descriptor set 318 corresponding to the image 310. The record status function 322-1 can be performed by the MMC 314 to further record status of one or more command buffers that are programmed to update the content of the image 310. Status of other commands that can be recorded when performing the record status 322-1 function can include copy commands initiated by the gaming application.

Based on the recorded status, the MMC 314 performs an identify content 322-3 function 322-4. In one implementation, the identify content function 322-4 calculates the hashcode for the image 310, such that the hashcode identifies the content of the image 310. For calculating the hashcode, the MMC 314 copies the content of the image 310 from its associated memory block in the GPU memory 308 to a CPU accessible memory (e.g., CPU memory 312). The MMC 314, based on the content of the image 310, can then calculate the hashcode of the image 310. This hashcode is recorded by the MMC 314. Alternatively, the hashcode can be calculated by the CPU 304. Other implementations for calculating hashcodes are contemplated.

In an implementation, the MMC 314 can identify when different levels of the game, executing on different client devices 350, need to access data from the sharable image 310. As described in the foregoing, such a determination could be made when each of the two or more client devices 350 are engaging with the game on distinct game levels, however, a given scene or frame to be rendered for each of the two or more client devices 350 uses data from the same image, i.e., image 310. In another example, the image 310 can also be shared between instances when generic textures or image data, such as those used to render objects such as walls, floors, trees, water, sky, etc. are required. Other implementation of sharing images are contemplated.

If the given image 310 is to be shared, the MMC 314 can perform the query memory 322-4 function to query shared memory blocks in the GPU memory 308 to determine if the content of the image 310 is already stored in a shared memory block (i.e., one or more given instances are already using the image's content). In one implementation, MMC 314 is configured to determine whether a shared memory block stores content of the image 310, based on the content identifier generated for the image 310. In one example, the content identifier is the hashcode associated with the image 310. In other examples, the content identifier can be any identifier representing a content of the image 310. When none of the shared memory blocks store or are associated with the content identifier, i.e., no other tasks are currently rendering from the image 310, the MMC 314 selects any available shared memory block to store content for the image 310. The content of the image 310 is copied from its dedicated memory block to the selected shared memory block. In such cases, an association or correlation between image data and respective memory addresses can be updated for the image 310. In an implementation, the image 310 is associated with a memory address of the shared memory block and this association replaces a previous association between the image 310 and the memory address of the dedicated memory block originally allocated to the image 310. Any subsequent tasks executing during one or more game instances, that require the use of image 310, can simply access the image 310 from the shared memory block using the updated association. In one implementation, the association is updated by the MMC 314 by performing the associate and replace function 322-3. In one or more implementations, associations between image data and memory addresses are stored in GPU memory 308.

Further, each time a request from the application is received for updating the original image view 316 to the descriptor set 318, the MMC 314 is configured to execute the transform commands 322-2 function, to transform the request to instead update the image view associated with the shared image. Furthermore, transform command function 322-2 is also performed by MMC 314 for transforming one or more other commands (e.g., copy commands initiated from the application) after the image 310 has been shared between two or more application instances. For example, any command calls from the application can be reinterpreted by the MMC 314 by executing underlying operations using data from the shared image.

In an implementation, each shared memory block storing images is assigned a reference counter. The reference counter for a shared memory block is indicative of how many game instances share the image 310 that is stored in the shared memory block. In another implementation, the reference counter can further indicate which game instances are currently sharing data from the image 310. In one example, each time an access to the image 310 is requested by a different game instance (e.g., responsive to a client input 360B from client device 350B), a reference counter of the shared memory block storing the image is updated (update reference count 322-5), e.g., increased by 1. Alternatively, when a game instance no longer accesses the image 310 (e.g., responsive to a client input 360N from client device 350N), the reference counter can be decreased by 1.

The image 310, in an implementation, is rendered by the rendering circuitry 324 to generate rendered image or other rendered graphics ("rendered output 340"). For example, the rendering circuitry 324 processes the image 310 to generate a 2D image from a 3D scene. The rendering circuitry 324 can process the image 310 to simulate the behavior of light, shadows, reflections, and other visual effects to create a realistic or stylistic representation of the scene. Further, the encoding circuitry 326 is configured to encode the rendered image involving converting the visual information of the image into a digital format that can be stored, transmitted, or manipulated by one or more client devices 350. In one implementation, the graphics output 370A is generated based on the encoded data generated by the encoding circuitry 326. The graphics output 370A is transmitted to the client device 350A (or to multiple client devices from the client devices 350A-N).

Figure 4:
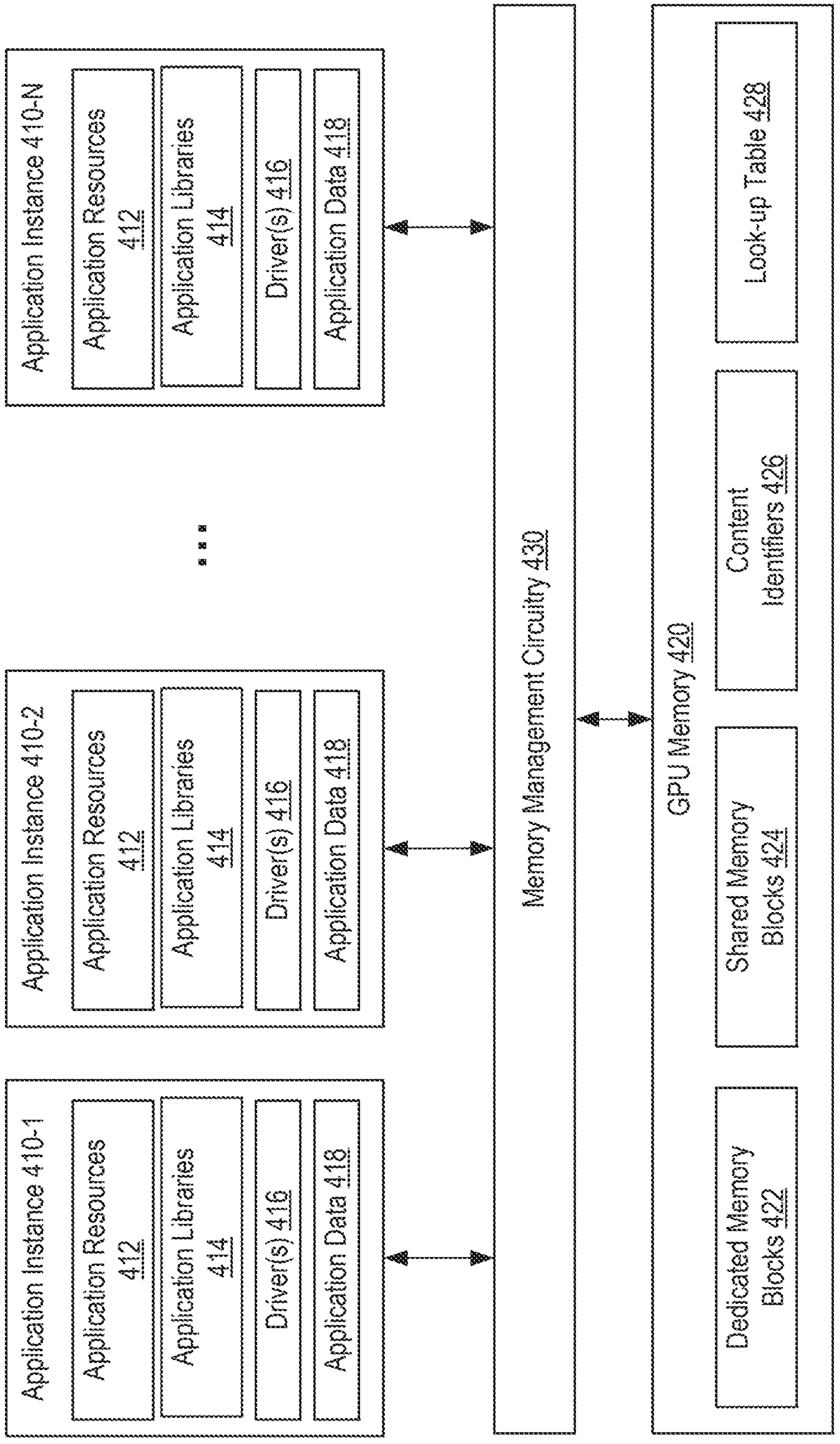
FIG. 4 is a block diagram illustrating distinct application instances of a cloud-based application.

Turning now to FIG. 4, a block diagram illustrating distinct application instances of a cloud-based application are described. As depicted a plurality of distinct application instances 410-1 to 410-N are shown, each managed by a memory management circuitry 430 (or MMC 430) for access to various data stored in a GPU memory 420. In an implementation, the GPU memory 420 includes dedicated memory blocks 422 and shared memory blocks 424. Further, content identifiers 426 stored in the GPU memory 420 can each represent content of a data block stored either in the dedicated memory blocks 422 or shared memory blocks 424. Furthermore, an association between a data block and memory address of a dedicated memory block 422 or a shared memory block 424 storing the data block is recorded as a look-up table 428 (also stored in the GPU memory 420).

In one implementation, during an execution cycle, when a given client device (not shown) engages with an application instance 410, input data can be generated (e.g., input data generated when accessing an application instance 410). The input data is processed by a processing circuitry (e.g., CPU 204 or GPU 206 shown in FIG. 2) to generate a graphics output that is transmitted back to the client device. In an implementation, for processing the input data generated in an application instance 410, the processing circuitry utilizes one or more application resources 412 associated with the application instance 410. For example, for gaming applications, the application resources 412 can include various types of assets and data utilized to create and enhance the gaming experience. The application resources 412 can be used to generate visual, audio, and interactive elements of the game. The application resources 412 can include resources such as graphics and visual resources, audio resources, level design resources, cinematic resources, and the like.

In an implementation, for cloud-based applications, application libraries 414 associated with each application instance 410 can be used by processing circuitry (and/or software) to streamline development, enhance functionality, and take advantage of cloud-specific features. The application libraries 414 include libraries, e.g., to manage backend infrastructure and front-end user interfaces. The application libraries 414 can include backend and server-side libraries, frontend libraries and frameworks, cloud service libraries, database libraries, authentication and authorization libraries, containerization, and orchestration libraries, and the like.

In an implementation, one or more drivers 416 associated with a given application instance include software components that enable communication and interaction between applications and hardware devices or external resources (e.g., communication between processing circuitry and client devices). These drivers 416 serve as intermediaries, allowing applications to utilize the functionality of hardware devices, peripherals, or other software components. The drivers 416 can include device drivers, network drivers, database drivers, A/V drivers, and the like. In one implementation, for cloud gaming applications based on a Vulkan API, a "Vulkan Loader" can be designed to provide efficient and high-performance access to graphics and compute capabilities on various hardware platforms. The Vulkan loader, in an implementation, is programmed to manage communication between application instances 410 and the drivers 416.

Application data 418, in an implementation, can include all data generated as a result of a client device engaging with an application instance 410. In an example, application data 418 includes information, content, and settings that are generated, stored, and managed by the application instance 410. In one implementation, application data 418 can be temporary or persistent (stored in GPU memory 420), and can encompass a wide range of formats, including text, images, audio, video, configuration settings, user preferences, and more.

In one implementation, application data 418 can include data blocks that can be sharable between different application instances 410. As described in the foregoing, a data block, such as an image, can be shared between different instances or levels of a cloud gaming application, e.g., when each such instance needs to render the same scene. The data blocks can be marked sharable by the MMC 430 based on their content. The content of each such data block can be identified (by the processing circuitry) and stored in the GPU memory as content identifiers 426.

In an implementation, whenever a data block is to be shared between two application instances 410, the MMC 430 can determine whether a shared memory block 424 already stores the data block, e.g., based on the data block's content identifier being assigned to the shared memory block 424. When such a shared memory block 424 is found, the MMC 430 increments a reference counter of the shared memory block 424 to indicate that the data block is now used by an additional application instance 410. The MMC 430 can continuously update the reference count of the shared memory block based on how many instances use the data block at any given point in time. For example, when a given instance discontinues use of the data block, the reference counter can be accordingly decremented. Further, reference counters can also indicate which application instances 410 currently share the data block, such that updating the reference counter appropriately identifies application instances 410 using the data from the data block.

However, if no shared memory block 424 currently stores the data block's content, the MMC 430 can copy the content of the data block from its originally assigned dedicated memory block 422 to a selected shared memory block 424. Responsive to copying the content to the shared memory block (or otherwise finding a shared memory block 424 already storing the data block's content), the MMC 430 can correlate the data block with the address of the shared memory block and store the correlation in the look-up table 428. This mapping can be utilized by subsequent tasks executing in the system to identify a memory location for the content of the data block. Further, the dedicated memory block 422 is freed up and can be used for other tasks.

In one implementation, the functionalities of the MMC 430 as described above can be alternatively built in a software component, e.g., an API layer. The software component can inspect various ongoing tasks within a computing system to determine when data is to be shared between two or more application instances 410. For instance, an API layer can communicate with an internal GPU memory management process (also built in software), e.g., through a domain socket, to determine data requirements for an application instance 410. Based on such data requirements, the API layer can manage memory allocation of the data blocks, such that these are adequately shared between multiple application instances 410 seamlessly. This and other software implementations of memory management based on methodologies described herein are contemplated.

Figure 5:
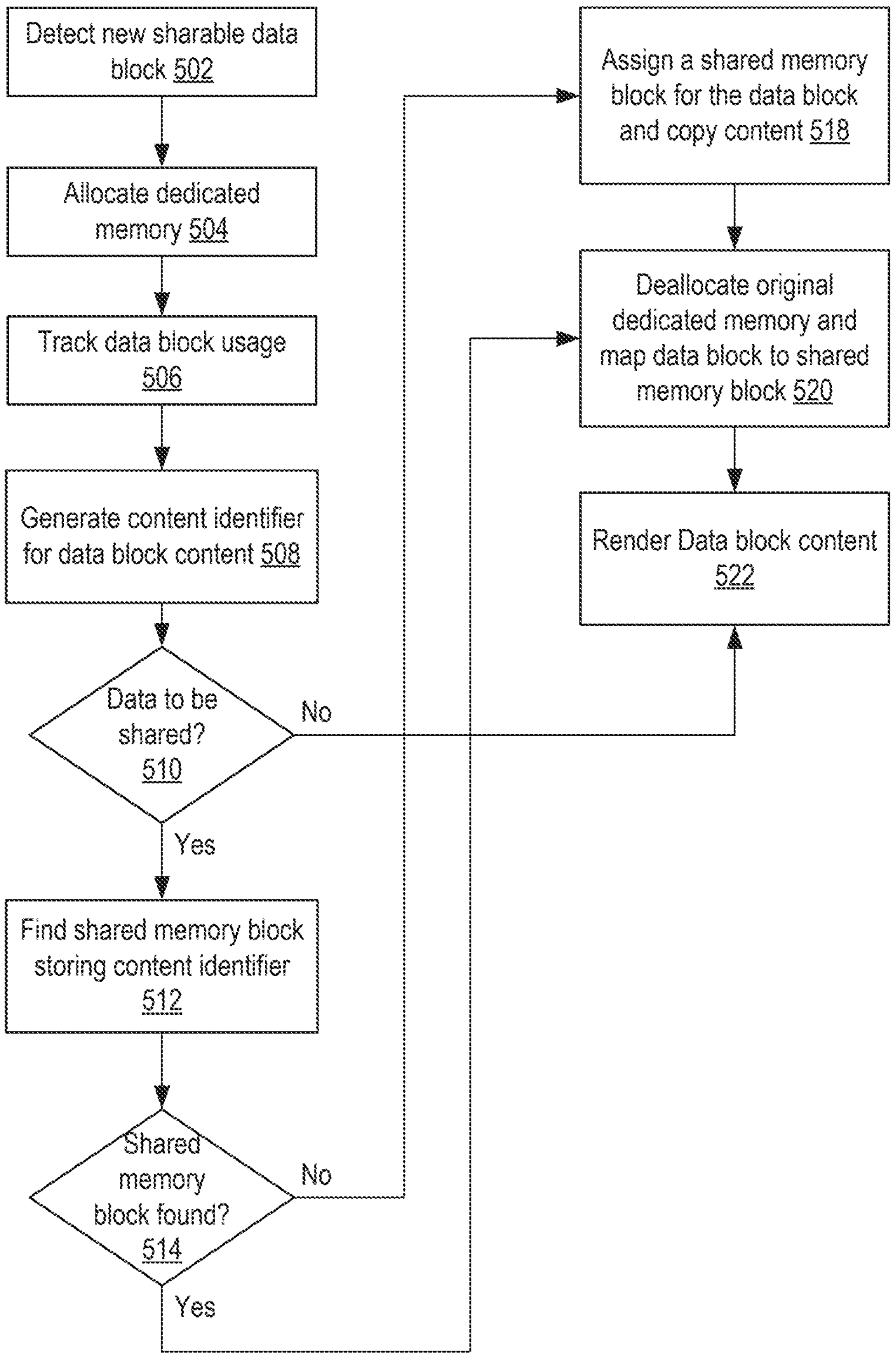
FIG. 5 is an exemplary method for sharing data blocks between multiple application instances, based on the content of the data blocks.

Turning now to FIG. 5, a method for sharing data blocks between multiple application instances, based on the content of the data blocks, is described. In one implementation, one or more processes described by the method can be performed by a processing circuitry (such as a CPU or a GPU) and/or a memory management circuitry (such as memory management circuitry 314 described in FIG. 3).

In an implementation, for cloud-based applications, multiple client devices can access and engage with such an application simultaneously over a network, such as the Internet. Further, for each client device engaging with the application, input data generated by the client device is processed by a processing circuitry to generate a graphics output. To generate such a graphics output, the input data is firstly processed to generate data blocks, (e.g., images). The memory management circuitry detects each time new sharable data blocks are generated (block 502). In an implementation, the memory management circuitry identifies a given data block as sharable based on the properties of the data block. For example, an image can be identified as being sharable based on its properties such as width of the image, height of the image, format of the image, usage flags associated with the image, tiling mode of the image, or a combination thereof. Other implementations of identifying which data blocks are sharable are contemplated.

The memory management circuitry is configured to allocate a dedicated memory block for each data block that is determined as sharable between multiple application instances, e.g., in the GPU memory (block 504). In one example, "sharable between multiple application instances" herein means that content of a given data block can be used by multiple rendering tasks simultaneously (e.g., using parallel processing) to generate graphics outputs at multiple client devices. These outputs can be similar (e.g., a scene rendered in a game that only has a single level) or different (e.g., scenes rendered during distinct levels of a complex game).

In some implementations, based on specifics of the cloud application, the data block can be assigned a non-dedicated memory block from the GPU memory. However, to replace an address of a non-dedicated memory block with an address of a shared memory block (e.g., when the image is later shared between application instances) can be difficult to achieve. Therefore, the memory management circuitry, responsive to identifying a request by the application for a non-dedicated memory block from the GPU memory, can transform this request to instead allocate a dedicated memory block for the data block. Dedicated memory block allocation can include assigning a specific portion of GPU memory that is reserved only for the data block and cannot be shared with other processes or components. Once sharing of the data block is to be realized, the memory management circuitry can replace the memory address of the dedicated memory block with an address of the shared memory block, such that the data block is accessible by multiple application instances simultaneously.

The memory management circuitry further tracks the usage of a given data block (block 506). In an example, tracking usage of the data block can include recording an original dedicated memory block allocated for the data block, recording what processes will upload and update the content of the data block, and the like. Based on the tracked usage of the data block, the processing circuitry is configured to generate a content identifier representing the content of the data block (block 508). In an implementation, the content identifier is a hashcode value associated with the data block.

In an implementation, the memory management circuitry can determine if the data block is to be shared between multiple application instances (conditional block 510). In one example, the data block can be shared in response to different application instances executing tasks that require the same content, i.e., the content of the data block. If the data block is not to be shared (conditional block 510, “no” block), the data block content is rendered by the processing circuitry (block 522). For example, when no other application instances need to share content from the data block, or data from the data block is otherwise being used only by a given task executing during a single application instance, the content of the data block is not shared and is rendered accordingly.

However, when the data block is to be shared (conditional block 510, “yes” leg), the memory management circuitry finds a shared memory block that previously stored (or is otherwise previously associated with) the data block’s content identifier (block 512). For example, when multiple tasks executing during distinct application instances (running concurrently) require the same content (content of the data block), the memory management circuitry identifies a memory location (“shared memory block”) at which the content of the data block is already stored. In an implementation, the memory management circuitry can make such an identification based on querying shared memory blocks, e.g., in GPU memory to determine if any of the shared memory blocks stores (or is otherwise associated with) the content identifier for the data block. The memory management circuitry then determines if such a shared memory block is found (conditional block 514). When no shared memory block stores the content identifier for the data block (conditional block 514, “no” leg), the method continues to block 518. At block 518, the memory management circuitry assigns selects a shared memory block and assigns the content identifier of the data block to the selected shared memory block. Further, the content of the data block is copied to the shared memory block from its originally allocated memory block (dedicated memory block allocated in block 504). This way, each time a process or task requires access to the content of the data block, it can access the shared memory block to access the content. Further, multiple tasks can simultaneously access the content by accessing the shared memory block at the same time.

However, if a shared memory block storing the data block’s content identifier is found, (conditional block 514, “yes” leg), the method continues to block 520. In one implementation, each time content of the data block is found in a shared memory block, or is copied from the memory block allocated originally to the data block to a shared memory block, the memory management circuitry deallocates the original memory block for the data block and maps the shared memory block address with the data block content (block 520). This mapping of the shared memory block address and the data block content replaces all previous mappings for the data block (e.g., a mapping between the data block and its originally allocated dedicated memory block, etc.). Thereafter, the processing circuitry, when executing every subsequent task involving the content of the data block (block 522), can access the content from the shared memory block instead.

Implementations presented herein can support existing cloud-based applications, without the need for modification of the application or application engine. Further, techniques described in the foregoing enable saving GPU memory when running different application instances, e.g., different game levels or save points. Therefore, more instances can be launched on a single GPU to meet an end-user’s requirements. Furthermore, data can be shared according to its content, instead of properties or ordinal index, avoid GPU allocation duplication or corruption. The solutions provided herein can also provide a feedback mechanism on which data can be shared.

It should be emphasized that the above-described implementations are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. A processor comprising:

memory management circuitry configured to:

allocate a first memory block to store a data block associated with an instance of an application executing in a cloud application system;

store association data that associates the data block with the first memory block; and responsive to content of the data block being duplicative of content stored in a shared memory block, update the association data to associate the data block with the shared memory block instead of the first memory block, wherein the updated association data is usable by at least two concurrently executing instances of the application to access the content stored in the shared memory block.

2. The processor as claimed in claim 1, wherein the first memory block comprises a dedicated memory block allocated responsive to the data block being marked as sharable between two or more instances of an application.

3. The processor as claimed in claim 1, wherein to update the association data, the memory management circuitry is configured to replace a memory address of the first memory block with a memory address of the shared memory block in a data structure.

4. The processor as claimed in claim 1, wherein the data block at least in part comprises image data, and wherein the memory management circuitry is configured to mark the image data as sharable between two or more distinct instances of an application, based at least in part on a content identifier associated with the image data.

5. The processor as claimed in claim 1, wherein the memory management circuitry is further configured to:
- generate a content identifier for the data block based at least in part on content of the data block;
- responsive to no shared memory blocks being associated with the content identifier:
  - assign the content identifier to a selected shared memory block; and
  - copy the content of the data block from the first memory block to the selected shared memory block.

6. The processor as claimed in claim 1, wherein the memory management circuitry is further configured to update a reference count associated with the shared memory block at least based in part on a number of distinct application instances sharing the data block.

7. The processor as claimed in claim 1, wherein the memory management circuitry is configured to generate a content identifier for the data block, based at least in part on the content of the data block.

8. A method comprising:
- allocating, by circuitry, a first memory block to store a data block associated with an instance of an application executing in a cloud application system;
- storing association data that associates the data block with the first memory block; and
- responsive to content of the data block being duplicative of content stored in a shared memory block, updating the association data to associate the data block with the shared memory block instead of the first memory block, wherein the updated association data is usable by at least two concurrently executing instances of the application to access the content stored in the shared memory block.

9. The method as claimed in claim 8, wherein the first memory block comprises a dedicated memory block allocated responsive to the data block being marked as sharable between two or more distinct instances of an application.

10. The method as claimed in claim 8, wherein updating the association data comprises replacing a memory address of the first memory block with a memory address of the shared memory block in a data structure.

11. The method as claimed in claim 8, wherein the data block at least in part comprises image data, and wherein the method further comprising marking, by the circuitry, the image data as sharable between two or more distinct instances of an application, based at least in part on a content identifier associated with the image data.

12. The method as claimed in claim 8, further comprising:
- generating a content identifier for the data block based at least in part on content of the data block;
- responsive to no shared memory blocks being associated with the content identifier:
  - assigning, by the circuitry, the content identifier to a selected shared memory block; and
  - copying, by the circuitry, the content of the data block from the first memory block to the selected shared memory block.

13. The method as claimed in claim 11, wherein the content identifier comprises a hash.

14. The method as claimed in claim 8, further comprising:
- tracking, by the circuitry, usage of the data block in a processing pipeline; and
- generating, by the circuitry, a content identifier based at least in part on tracked usage and the content of the data block.

15. A system comprising:
- at least one processing circuitry; and
- memory management circuitry configured to:
  - allocate a first memory block to store a data block associated with an instance of an application executing in a cloud application system;
  - store association data that associates the data block with the first memory block; and
  - responsive to content of the data block being duplicative of content stored in a shared memory block, update the association data to associate the data block with the shared memory block instead of the first memory block, wherein the updated association data is usable by at least two concurrently executing instances of the application to access the content stored in the shared memory block.

16. The system as claimed in claim 15, wherein replacing the data that associates the data block with the first memory block comprises updating an entry in a data structure to store a memory address of the shared memory block in place of a memory address of the first memory block.

17. The system as claimed in claim 15, wherein a determination that the content is duplicative comprises comparing a content identifier generated for the data block with content identifiers associated with shared memory blocks.

18. The system as claimed in claim 15, wherein the memory management circuitry is further configured to copy the content of the data block from the original memory block to a selected shared memory block.

19. The system as claimed in claim 15, wherein the memory management circuitry is further configured to update a reference count associated with the shared memory block based in part on a number of distinct application instances sharing the data block.

20. The system as claimed in claim 17, wherein the memory management circuitry is configured to:
- track usage of the data block in a processing pipeline; and
- generate the content identifier based at least in part on the tracked usage.

* * * * *